Aug. 18, 1959 K. G. HARLAN 2,900,289
TRANSITION FUEL CELLS
Filed Jan. 30, 1957
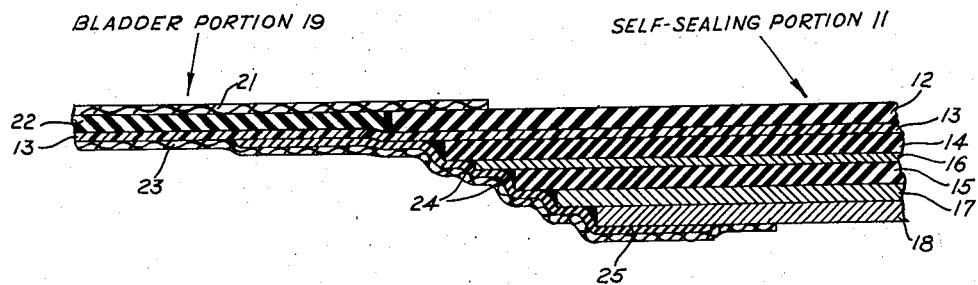
INVENTOR.
KENNETH G. HARLAN
BY
ATTORNEYS : 2,900,289
Patented Aug. 18, 1959

2,900,289

TRANSITION FUEL CELLS

Kenneth G. Harlan, Gahanna, Ohio, assignor, by mesne assignments, to the United States of America as represented by the Secretary of the Navy Application January 30, 1957, Serial No. 637,342

1 Claim. (Cl. 154—43.5)

The present invention relates to fuel cells, and more particularly to a fuel cell having a portion of its area formed of a self-sealing construction. This invention relates particularly to fuel cells intended for use in military vehicles wherein the fuel cells are likely to be punctured by foreign bodies, such as missiles.

Self-sealing fuel tanks are well known and widely used, particularly in military aircraft, as the loss of only a small percentage of the fuel being carried may result in the aircraft not being able to return to its home base. Although there are many versions and modifications of self-sealing fuel tanks, they can be classed generally as either the bladder type or the full self-sealing type.

The bladder type, one of which is illustrated in U.S. Patent No. 2,039,401, issued to Foges, has a sealing substance embedded between an outer casing and a bladder or inner tube, and is relatively inexpensive in that only a portion of the total surface of the bladder is protected by the more expensive self-sealing composition, which is of a multiple layer design.

The full self-sealing type of cells, one of which is described in U.S. Patent No. 2,626,882, issued to Gerke, is usually made by assembling a multiple number of various layers of rubber, fabric, and sealants, provided with necessary fittings, and then vulcanized. This type of construction is more expensive and also substantially heavier than the bladder type fuel cell.

The present invention relates to a fuel cell that might be classed, generally, as a bladder type cell but differs from the standard bladder type in that the bladder is made integral with the self-sealing portion of the fuel cell. This improved type bladder cell has the advantage of being of a single unit construction as found in the full self-seal type, and yet retains the advantages of the bladder type cells in that it is relatively economical in cost and substantially lighter in weight. The latter factor being of extreme importance today, as weight reduction is a prime design requirement in military aircraft.

It is therefore a general object of the present invention to provide an improved bladder type fuel cell having a bladder portion integrally attached to a self-sealing portion.

Other objects and many of the attendant advantages of the present invention will be readily appreciated as the same becomes better understood by reference to the following detailed description when considered in connection with the accompanying drawing wherein the figure represents a partial sectional view of a fuel tank showing the transition of the bladder portion into the self-sealing portion.

Referring now to the figure in the drawing, there is shown a self-sealing portion 11, which by way of example, may be comprised of a plurality of layers of flexible materials, such as a natural rubber innerliner 12, a nylon layer 13, two sealant layers 14 and 15 having a tire cord layer 16 therebetween, and additional layers of tire cord 17 and 18 which are cross-plied. The relatively stiff plies of the tire cord 16, 17, and 18 spring back together after a missile or other object has passed therethrough, thus closing the tear or gap made by the missile or other object and aiding in sealing the fuel cell. By way of example, the sealant layers 14 and 15 might be layers of crude, unvulcanized rubber which when contacted with hydrocarbon liquids swell, thus sealing any holes or tears made by missiles.

The addition of aromatic fuels to high octane gasoline provides an additional problem in that these aromatic fuels have a tendency to diffuse through rubber, and upon reaching the crude, unvulcanized sealant layers, cause undesired swelling. To prevent this diffusion, the layer of nylon 13 is provided, and swelling and softening of the sealant is avoided. As it is also necessary to provide a diffusion barrier in the bladder portion 19, the layer of nylon 13 is continued into the bladder portion 19, as shown in the drawing.

The bladder portion 19, by way of example, might be comprised of a plurality of layers of flexible material, such as a rubberized fabric 21, a layer of rubber compound 22, the nylon layer 13 continued from the self-sealing portion 11, and an outside layer of rubberized fabric 23.

In transition from the self-sealing portion 11 to the bladder portion 19, the rubber innerliner 12 is terminated and bonded to the rubberized fabric 21 and the layer of rubber compound 22. The nylon layer 13 is continued from the self-sealing portion 11 into the bladder portion 19 and consequently no bonding or attaching is required. The sealant layers 14 and 15, and the layers of tire cord 16, 17 and 18 are terminated in stepped or overlapped relation and their ends brushed or coated with a nylon barrier material to prevent diffusion of the fuels into the sealant layers. Forming strips 24, which might be made of any suitable material, are provided to help blend the stepped layers of material into a smooth contour and a gum isolating strip 25 is provided longitudinally over the forming strips 24. The outer layer of rubberized fabric 23 of the bladder portion 19 overlaps the outer layer of tire cord 18 and is bonded thereto.

The various layers of the self-sealing portion 11 and the bladder portion 19 might be secured together in any well known manner, such as by heat sealing, cementing, or the like.

Obviously many modifications and variations of the present invention are possible in the light of the above teachings. For example, it is obvious that various arrangements of layers may be employed in forming both the bladder portion and the self-sealing portion of the fuel cell. Also, it is contemplated that the present invention is applicable to rigid, semi-rigid and flexible fuel cells, as well as being capable of application to both supported and non-supported constructions. It is therefore to be understood that the invention may be practiced otherwise than as specifically described.

I claim:

A fuel cell having a self-sealing portion and a bladder portion comprising, a natural rubber inner liner in said self-sealing portion in abutting relation with a layer of rubber in said bladder portion, a layer of rubberized fabric in said bladder portion in united relation with said layer of rubber and extending into and united to a portion of said inner liner of said self-sealing portion, a layer of nylon united to the inner liner of said self-sealing portion and continued into and united to the layer of rubber of said bladder portion, first and second layers of a sealant material in said self-sealing portion separated by a layer of tire cord said sealant layers and tire cord layer having the ends thereof adjacent said bladder portion terminating in step relations, second and third layers of tire cord in said self-sealing portion in cross-plied relation with one another and having the ends thereof adjacent said bladder portion terminating in step relations, a plurality of forming strips one each contiguous with the ends of each layer of said self-sealing portion whereby the stepped layers are blended in a more smooth contour, and a rubberized fabric in united relation with the layer of nylon in said bladder portion and overlapping the stepped layer portions in said self-sealing portion.

References Cited in the file of this patent

UNITED STATES PATENTS

| | | |
|---|---|---|
| 1,144,239 | Poole | June 22, 1915 |
| 2,439,366 | McLaughlin | Apr. 6, 1948 |
| 2,439,562 | Cunningham | Apr. 13, 1948 |
| 2,626,882 | Gerke | Jan. 27, 1953 |
| 2,629,680 | Henry | Feb. 24, 1953 |